Patented Nov. 13, 1951

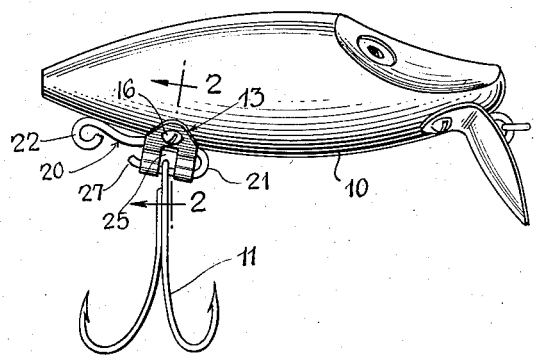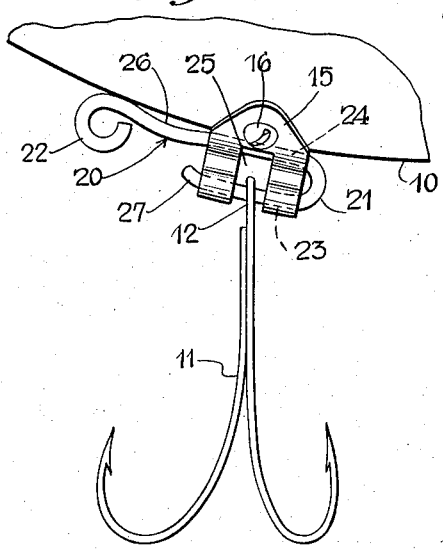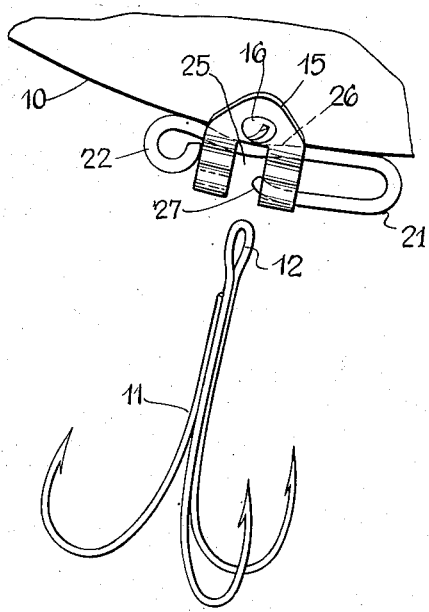

2,575,044

UNITED STATES PATENT OFFICE 2,575,044

DETACHABLE FISHHOOK CONNECTOR

Ferris H. Caldwell, Canton, N. Y.

Application September 13, 1950, Serial No. 184,637

3 Claims. (Cl. 43—42.44)

This invention relates to detachable connecting means for connecting fish-hooks to fishing plugs or the like.

Fishing plugs, spoon constructions and the like members of the type having a fish-hook or groups of fish-hooks permanently attached thereto are, when not in use, inconvenient to handle or to pack away without becoming entangled with other fishing tackle or injuring the user. For this reason and also to permit interchangeability or replacement of the hooks, various efforts have been made to provide a detachable connection between such devices and the hooks. But such detachable connections, so far as I am aware, have involved various difficulties in that they are either relatively expensive to construct or difficult to operate, and more particularly such detachable connections as heretofore proposed, if simple and easy to operate, are prone to come apart or release the hooks when subjected to heavy strains or when the fishing tackle is thrashed about while catching a fish.

With the present invention, an extremely simple and inexpensive detachable connection for the above indicated purpose is provided, in such form that even after repeated, prolonged and severe use, it will still safely secure the hooks in place during use, and yet it may be very conveniently and quickly manipulated when it is desired to release, replace or attach the hooks.

Various further and more specific features and advantages of the invention will appear from the description given below, taken in connection with the accompanying drawings illustrating the presently preferred form of the invention.

In the drawings:

Fig. 1 is a side elevational view of a fishing plug with a hook assembly detachably secured thereto in accordance with the invention;

Fig. 2 is an enlarged sectional view partly broken away, taken substantially along line 2—2 of Fig. 1; and Figs. 3 and 4 are enlarged views of the connection, showing respectively the parts in connecting and releasing positions.

Referring now to the drawings in further detail, a fishing plug of conventional form is indicated at 10. A conventional form of hook assembly is indicated at 11, having the usual form of eyelet 12 at its upper end.

The detachable connecting means of the invention preferably comprises a strip of fairly rigid sheet metal 13, the ends of which are in the form of tabs 14, 15, each secured to the plug as by screws 16.

The two tab portions 14 and 15 are integrally interconnected by the middle portion of the sheet metal strip which is so bent that, starting from one of the tabs, it is curved inwardly and downwardly, around and then similarly upwardly to the other tab in such a way as to leave a cavity or channel at 17 adjacent the surface of the plug and between the two tabs, and another cavity or channel as at 18 within the lower portion of the bent formation.

A key member 20 which may be formed of a short length of wire is provided. One end portion of this member is bent to U-shaped form as at 21 and the other end is suitably shaped as at 22 to form a finger piece. One branch of the U-shaped portion as at 23 is slidably received in the above-mentioned cavity or channel 18, whereas the other branch of the U-shaped portion, as at 24, is slidably received in the cavity or channel 17. The middle portion of the depending part of the sheet metal strip is cut away as at 25 so as to expose a part of the lower branch of the U-shaped portion and provide clearance for receiving the eyelet 12 of the hook assembly. The key member 20 is longitudinally slidable from the position shown in Figs. 1 and 3, to the position shown in Fig. 4. In the latter position, it will be noted that the finger portion 22 will constitute a stop means engaging the edge of the sheet metal, and at this time the lower branch 23 of the U-shaped portion will have been moved out of the cut-out portion 25 so that the fish-hook eyelet will be released. Yet the key member will still be retained against sliding completely out of the sheet metal member. In order again to attach a fish-hook or fish-hook assembly, it will be apparent that the eyelet therefor may first be inserted in proper position in the cut-out portion 25, whereupon the finger portion 22 is thrust to the left to secure the eyelet against release, in the manner best shown in Fig. 3.

The upper branch 24 of the key member 20 is so shaped that it will be engaged with considerable frictional resistance between the body of the plug and the curved portions of the sheet metal at the cavity or channel 17. For this purpose, preferably a portion is bowed downwardly substantially as indicated at 26, so that it will act in the manner of a bowed spring, the lower side of the mid-portion of which resiliently and slidably bears against the sheet metal at the region of the crevice at the lower side of the channel 17, the upper part of the end portion of the spring formation bearing against the plug at two points, viz., adjacent the finger piece 22 and adjacent the U-shaped end portion of the key member. The frictional resistance resulting from this bowed spring formation will be sufficient firmly to retain the key member against slidable movement except upon deliberate sliding of the finger piece 22 by the user.

So long as the key member remains in the position as shown in Figs. 1 and 3, it will be apparent that the hook eyelet will be secured against release. The cut-out portion 25 is made sufficiently wide so that the hook eyelet will be quite free to move about on the portion 23, and if the hook construction is pulled even violently either forwardly or rearwardly, the eyelet will come into engagement with the double edges of the sheet metal at the borders of the cut-out portion 25 and thus be held firmly. The frictional resistance of the hook eyelet in sliding along the wire portion 23 will be far less than the frictional resistance of the bowed spring formation above described, so that there will be no danger that the movements of the eyelet in any direction will tend to slide the key member to releasing position. The construction is such that the hook or hook assembly cannot in any event be turned to such a position as to engage the finger piece 22 and cause it to slide.

If desired, the end of the lower branch 23 of the U-shaped portion may be bowed somewhat upwardly as at 27, in order to add further frictional resistance against sliding in the channel 18.

It will thus be seen that a very secure detachable connection is provided for the purpose indicated, and that only two simple inexpensive parts in addition to the screws or other securing means are necessary.

As above indicated, the invention is not only adapted for detachably securing hooks or hook assemblies to conventional forms of fishing plugs, such as for example shown in Fig. 1, but may also be used as a hook attachment to various other types of fishing tackle parts or lures.

What is claimed as new and desired to be secured by Letters Patent of the United States is:

1. A detachable connection for securing fishhook eyelets to fishing plug members and other fishing tackle members, comprising in combination a strip of sheet metal having end portions comprising a pair of closely spaced tabs for securement to the member, the middle portion of said sheet metal strip being formed to extend from one tab away from the member downwardly around and thence back up to the other tab and forming two spaced-apart generally parallel channels, one of which channels is positioned to extend along the surface of the member and the other channel being spaced therefrom, the mid-portion of such sheet metal strip having a cut away portion at a region intermediate the ends of the latter channel to provide a space for receiving the fish hook eyelet, and a longitudinally slidable key member having a finger portion at one end and a U-shaped portion at the other end, the branches of such U-shaped portion being slidable respectively in said channels.

2. A detachable connection for securing fishhook eyelets to fishing plugs and the like, comprising in combination, a member adapted to be mounted on the lug or the like and shaped to provide a pair of substantially parallel channels, and a U-shaped wire key having its two branches respectively slidably received in said channels, said member having a cut-away portion at a region intermediate the ends of one of said channels to provide a space for receiving the fish-hook eyelet through which one branch of said key is slidable, the other of said branches being formed with an extension positioned to slide along the plug surface and provide a finger piece for operating the key.

3. A detachable connection for securing fishhook eyelets to fishing plug members and other fishing tackle members, comprising in combination a strip of sheet metal having an end portion comprising a tab for securement to the member, a portion of said metal strip being formed to extend from such tab away from the member downwardly around and thence back up to the member and forming two spaced-apart generally parallel channels, one of which channels is positioned along adjacent the surface of the member and the other channel being spaced therefrom, the mid-portion of such sheet metal strip having a cut-away portion at a region intermediate the ends of the latter channel to provide a space for receiving the fish-hook eyelet, and a longitudinally slidable wire key having a finger portion at one end and a U-shaped portion at the other end, the branches of such U-shaped portion being slidable respectively in said channels and said finger portion being curved to slidably engage the member and apply frictional resistance thereon against unintended sliding of the key.

FERRIS H. CALDWELL.

REFERENCES CITED

The following references are of record in the file of this patent:

UNITED STATES PATENTS

| Number | Name | Date |
|---|---|---|
| 52,615 | Harkins | Mar. 22, 1910 |
| 1,299,432 | Dickens | Apr. 8, 1919 |
| 2,198,043 | Scogland et al. | Apr. 23, 1940 |
| 2,281,809 | Smith | May 5, 1942 |